United States Patent
Anumu et al.

(10) Patent No.: US 6,670,059 B2
(45) Date of Patent: Dec. 30, 2003

(54) FUEL CELL SYSTEM HAVING FLOW-DIVERTING ELEMENT

(75) Inventors: Phillip Atte Anumu, Königsbach-Stein (DE); Axel Krüger, Weilheim (DE); Carlo Saling, Wolfschlugen (DE); Matthias Wolfsteiner, Kirchheim (DE)

(73) Assignee: Ballard Power Systems AG, Kirchheim/Teck-Nabern (DE)

( * ) Notice: Subject to any disclaimer, the term of this patent is extended or adjusted under 35 U.S.C. 154(b) by 278 days.

(21) Appl. No.: 09/916,280

(22) Filed: Jul. 30, 2001

(65) Prior Publication Data

US 2002/0048697 A1 Apr. 25, 2002

(30) Foreign Application Priority Data

Jul. 29, 2000 (DE) .......................................... 100 37 062

(51) Int. Cl.⁷ ................................................ H01M 8/04
(52) U.S. Cl. ............................ 429/17; 429/13; 429/19; 429/20; 429/22; 429/24; 429/26; 429/34; 429/38; 429/39
(58) Field of Search .............................. 429/13, 17, 19, 429/20, 22, 24, 26, 34, 38, 39

(56) References Cited

U.S. PATENT DOCUMENTS

| | | | |
|---|---|---|---|
| 5,144,796 A | | 9/1992 | Swars |
| 5,648,182 A | * | 7/1997 | Hara et al. ..................... 429/20 |
| 5,843,195 A | * | 12/1998 | Aoyama ..................... 48/127.7 |
| 6,277,508 B1 | * | 8/2001 | Reiser et al. .................. 429/17 |
| 6,294,278 B1 | * | 9/2001 | Wohr et al. .................... 429/24 |
| 6,387,555 B1 | * | 5/2002 | Wheeler et al. ............... 429/17 |
| 6,544,677 B2 | * | 4/2003 | Matejcek ..................... 429/20 |
| 6,572,994 B1 | * | 6/2003 | Shimotori et al. ............ 429/26 |
| 6,582,841 B2 | * | 6/2003 | Okamoto et al. ............. 429/13 |
| 6,586,126 B1 | * | 7/2003 | Ogawa et al. ................ 429/22 |

FOREIGN PATENT DOCUMENTS

| | | |
|---|---|---|
| DE | 197 27 588 | 6/1997 |
| EP | 0887307 | 12/1998 |

OTHER PUBLICATIONS

Copy of Search Report.

* cited by examiner

*Primary Examiner*—Bruce F. Bell
(74) *Attorney, Agent, or Firm*—Crowell & Moring LLP

(57) ABSTRACT

A fuel cell system includes a gas generation device for the catalytic steam reforming of a steam/fuel mixture and/or for the partial oxidation of an oxygen/fuel mixture for generating a hydrogen-rich medium and a gas cleaning stage for removing carbon monoxide from the product gas of the gas generation device using selective CO oxidation. A principal flow path of the medium is split at least over a certain length into a first and a second parallel flow path and is then brought together again. A flow-diverting means is provided at least in the first flow path in order to open or block the first flow path in a temperature-dependent manner.

17 Claims, 1 Drawing Sheet

FUEL CELL SYSTEM HAVING FLOW-DIVERTING ELEMENT

BACKGROUND AND SUMMARY OF INVENTION

This application claims the priority of application No. 100 37 062.4, filed Jul. 29, 2000, the disclosure of which is expressly incorporated by reference herein.

The present invention relates to a fuel cell comprising (1) a gas generation device for catalytic steam reforming of a steam/fuel mixture and/or for the partial oxidation of an oxygen/fuel mixture for generating a product gas containing hydrogen-rich medium; and (2) a gas cleaning stage for removing carbon monoxide from the product gas by selective CO oxidation.

In the cold-start phase, a polymer electrolyte membrane (PEM) fuel cell system is operated in operating states which are not optimum, which represents a drawback in particular for the reactions in the gas generation system that are thermally adapted to one another. However, when starting up, the gas generation system has to be brought to operating temperature. In the case of a cold start, this leads to water or water/methanol mixture condensing out upstream of and in the gas cleaning stage. This condensation leads to wetting of the active catalyst surface in the reactor and therefore to the starting time being extended.

DE 197 27 588 A1 discloses a device and a method for generating a hydrogen-rich gas that is low in carbon monoxide. The product gas containing hydrogen and carbon monoxide is generated in a gas generation device from a water/fuel mixture by catalytic steam reforming and/or from an oxygen/fuel mixture by partial oxidation. In a gas cleaning stage, the carbon monoxide content in the product gas is lowered by selective CO oxidation at an oxidation catalyst. In this document, it is also proposed that, in order to improve the cold-start properties, for oxygen to be admixed with the fuel supplied during a starting phase and for the direction of flow to be reversed in such a manner that the media flow first through the gas cleaning stage and only then through the gas generation device.

An object of the present invention is to provide a fuel cell system having acceptable cold-start properties.

This object is achieved by a device according to the present invention.

According to the present invention, flow-diverting means are provided in a fuel cell system, in order to open or block flow paths for a medium in a temperature-dependent manner.

Compared to the prior art, the fuel cell system according to the present invention results in a simple solution without complex additional components.

Other objects, advantages and novel features of the present invention will become apparent from the following detailed description of the invention when considered in conjunction with the accompanying drawings.

DETAILED DESCRIPTION OF THE DRAWINGS

The present invention is particularly suitable for the cold-starting of devices such as gas generation systems of fuel cell systems with reactors which are only able to function at temperatures higher than a defined starting temperature. It is particularly preferably for such cold-starting reactors according to the present invention to be used at catalytic burner units and carbon monoxide removal units in fuel cell systems.

In the text which follows, the present invention is explained on the basis of a CO oxidation stage in a fuel cell system, but is not intended to be restricted to the operating medium used in such a stage and may also be used at other locations of the fuel cell system.

A conventional device for generating a hydrogen-rich medium which is low in carbon monoxide has (1) a gas generation device for the catalytic steam reforming of a steam/fuel mixture and/or for the partial oxidation of an oxygen/fuel mixture; and (2) a gas cleaning stage for removing carbon monoxide from the product medium with the aid of selective CO oxidation. The reactors of the gas generation device and the gas cleaning stage have feed and discharge lines. A device of this type is preferably used in a PEM fuel cell system. The cold-starting reactor according to the present invention may be used in a device of this type.

During the cold-starting of a fuel cell system or of a gas generation system, in which a reformate which is rich in hydrogen gas is generated for operation of the fuel cell system by reforming of an operating medium (e.g. methanol), water or water/methanol mixture may condense out, since the operating medium is not completely converted at temperatures which are lower than the operating temperature. It is also possible that the carbon monoxide content in the reformate may be undesirably high. The condensation of media may lead to the system becoming blocked or to catalysts being wetted and thereby deactivated by the liquid, so that the actual starting phase of the system is extended unnecessarily. The undesirably high carbon monoxide content may damage the catalysts of downstream reactors or even of the fuel cell unit itself.

Figure 1:
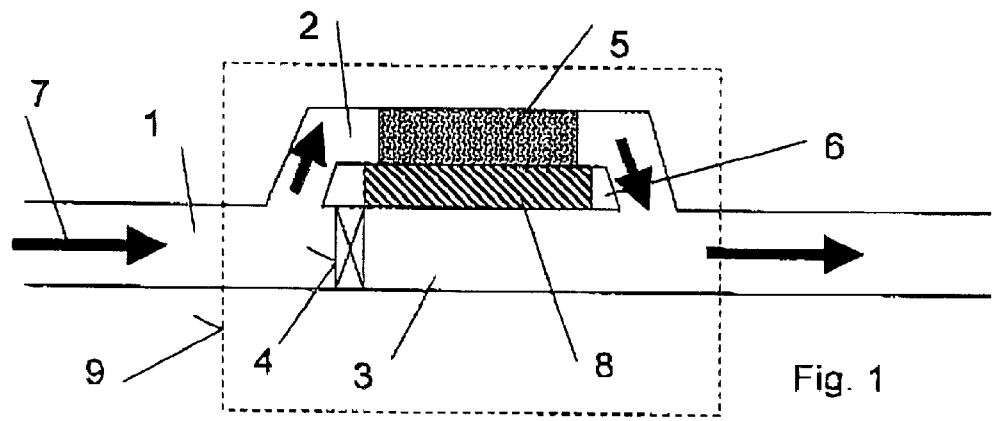
FIG. 1 shows an outline view of a device at low temperatures.

FIG. 1 shows an outline view of an arrangement according to the present invention, in which the arrangement is at a temperature which is lower than a predetermined temperature $T_B$. $T_B$ preferably corresponds to a desired operating temperature in the gas generation device and/or the gas cleaning stage.

A medium 7, preferably which is rich in hydrogen gas and has been generated in a gas generation system from a fuel and/or a steam/fuel mixture, flows in a principal flow path 1. At operating temperatures, the medium comprises hydrogen gas with the lowest possible carbon monoxide content. In the following cleaning stages, the carbon monoxide is removed as completely as possible. At temperatures below the operating temperatures of the gas generation device, the medium 7 may also entrain undesirable unconverted quantities of the fuel and/or water/fuel mixture.

The principal flow path 1 branches, in a specific region, into a first flow path 3 and a second flow path 2 which is parallel to the first flow path, and is then brought together again to form the principal flow path 1 downstream of this branching. Adsorber means 5 are arranged in the second flow path 2 in the region of the branching. The two separate flow paths 2, 3 are spaced apart by a cavity 6, in which heat-transfer means 8 are preferably arranged. This makes it possible to ensure that the two flow paths are at a temperature which is as homogeneous as possible. It is also advantageous for the entire region of the adsorber section having the adsorber means 5 to be provided with thermally insulating means 9, in order to minimize heat losses from this region. The first and second flow paths 2, 3 are then expediently enclosed by the thermally insulating means 9.

In the first flow path 3, there is a flow-diverting means 4, so that the first flow path 3 is blocked at temperatures below the predetermined temperature $T_B$. The medium 7 then flows through the second flow path 2 and through the adsorber means 5. The adsorber means 5 are preferably suitable to adsorb condensing water and/or to store carbon monoxide. It is also possible for a plurality of adsorbers 5 to be provided in series, in which case these adsorbers are each able to adsorb different materials.

The device is preferably arranged downstream of the gas generation device and upstream of a gas cleaning stage. A preferred adsorber 5 is a zeolite or activated carbon.

After starting, initially cold medium 7 flows through a cold installation, the temperature rising as a result of exothermal reactions of catalytic processes in upstream reactors and/or additional temperature-control measures. When the predetermined temperature $T_B$ has been reached, the first flow path 3 is opened. The second flow path 3 may be closed, so that the medium 7 flows entirely through the first flow path 3.

In an expedient configuration of the present invention, a flow-diverting means, which at low temperatures below $T_B$ opens the second flow path 2 and at above $T_B$ blocks the second flow path at least in regions, may additionally be provided in the second flow path, upstream or downstream of the adsorber region. In this way, it is easy to set the flow resistance of the second flow path 2.

Figure 2:
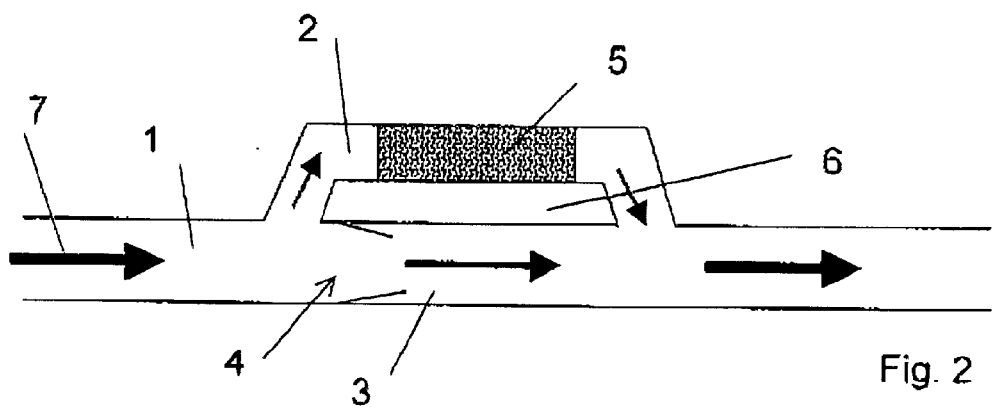
FIG. 2 shows an outline view of a device at operating temperature with flow splitting.

In one configuration of the present invention, the medium 7, which is now hot, can flow through both flow paths 2, 3. This situation is illustrated in FIG. 2. Identical elements are denoted by identical reference numerals. On account of the adsorber 5, and possibly also on account of suitably selected cross sections of the two flow paths 2, 3, there is a considerable pressure loss in the second flow path, so that only a small quantity of medium flows through the second flow path 2, while most of the medium 7 flows through the first flow path. However, the small quantity of medium is sufficient to regenerate the adsorber means 5, since there is now little or no carbon monoxide or condensed water or water/methanol mixture. On account of the low throughput of the medium in the second flow path 2, the adsorbates, which are being desorbed, are only present in low concentrations in the overall flow of medium, for a prolonged period, so that they do not disturb normal operation of components arranged downstream. Therefore, it is possible for the device to operate continuously, and the adsorber means 5, after operation, are once again available for use for a cold start. The heat-transfer means 8 can advantageously assist this regeneration process.

The flow-diverting means 4 may be a bimetal element which, by a temperature-dependent change in length, at least indirectly covers or opens the first flow path 3. The flow diversion takes place passively and is only initiated by the temperature of the arrangement.

A suitable additional flow-diverting means in the second flow path 2 has an accordingly opposite temperature behavior. At low temperatures, the bimetal element is such that the second flow path 2 is open, while at high temperatures the bimetal element blocks the second flow path 2. In this case, a cross section of the second flow path 2 may remain open, so that the flow resistance of the second flow path 2 can be set by the adsorber, on the one hand, and the flow-diverting means, on the other hand.

Figure 3:
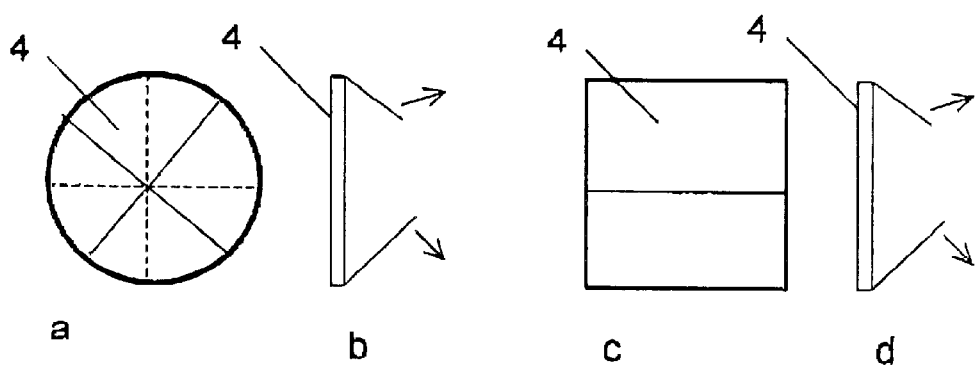
FIGS. 3a, b, c, d show a first bimetal element in closed form (a) and open form (b), and a second bimetal element in closed form (c) and open form (d).

FIG. 3 illustrates two types of bimetal elements which may be arranged in the first and/or second flow path 3, 2. FIG. 3a shows a round element 4 which is divided into segments. The segments are closed below the predetermined temperature $T_B$. At a higher temperature, the segments move, as a result of deformation of the bimetal, in such a way that the cross section of the element 4 is opened (FIG. 3b). The greater the number of segments, the lower the pressure loss when medium is flowing through. This flow-diverting means 4 is particularly suitable for tubular flow paths.

FIG. 3c shows a further configuration of the flow-diverting means 4. It comprises a rectangle which is divided into two rectangular segments. For this purpose, the first flow path 3 may be of correspondingly rectangular configuration at least in the region of the flow-diverting means 4. At or above $T_B$, the segments are deformed and thereby open the first flow path 3.

It is advantageous that, on account of its thermal change in length, a bimetal element is able to open or block a cross section by deformation. This deformation takes place passively, simply as a result of a temperature change, and is substantially reversible.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A fuel cell system, comprising:
   a gas generation device for catalytic steam reforming of a steam/fuel mixture and/or for the partial oxidation of an oxygen/fuel mixture, thereby generating a product gas containing hydrogen-rich medium;
   a gas cleaning stage for removing carbon monoxide from the product gas by selective CO oxidation,
   wherein said fuel cell system comprises a principal flow path for a media that is split at least over a certain length into first and second parallel flow paths which are then brought together again,
   wherein a flow-diverting means is arranged at least in the first parallel flow path to open or block the first parallel flow path in a temperature-dependent manner.

2. A fuel cell system according to claim 1, wherein:
   the first parallel flow path is blocked and the second parallel flow path is open at temperatures below a predetermined temperature ($T_B$), and
   at least the first flow path is opened at temperatures of at least the predetermined temperature ($T_B$).

3. A fuel cell system according to claim 1, further comprising an additional flow-diverting means arranged in the second parallel flow path so that the second parallel flow path is open at temperatures below a predetermined temperature ($T_B$), and a flow resistance in the second parallel flow path can be adjusted at temperatures of at least the predetermined temperature ($T_B$) by closing the additional flow-diverting means.

4. A fuel cell system according to claim 3, wherein the additional flow-diverting means in the second parallel flow path is a bimetal element which, by temperature-dependent deformation, at least indirectly covers or opens the second parallel flow path.

5. A fuel cell system according to claim 1, further comprising an adsorber in the second parallel flow path.

6. A fuel cell system according to claim 5, wherein the second parallel flow path has adsorbers that are connected in series.

7. A fuel cell system according to claim 4, wherein the second parallel flow path has at least one of a water adsorber or a carbon monoxide absorber.

8. A fuel cell system according to claim 5, wherein the adsorber is a zeolite.

9. A fuel cell system according to claim 5, wherein the adsorber is activated carbon.

10. A fuel cell system according to claim 5, wherein the first parallel flow path is spaced apart from the second parallel flow path by a cavity.

11. A fuel cell system according to claim 10, further comprising a heat-transfer device in the cavity.

12. A fuel cell system according to claim 10, further comprising thermal insulation in a region of the adsorber.

13. A fuel cell system according to claim 1, wherein the flow-diverting means is a bimetal element that, by temperature-dependent deformation, at least indirectly covers or opens the first parallel flow path.

14. A fuel cell system according to claim 1, wherein the flow-diverting means is arranged between the gas generation device and the gas cleaning stage.

15. A fuel cell system according to claim 1, wherein the flow-diverting means is arranged downstream of the gas cleaning stage.

16. A fuel cell system, comprising:
 a gas generation device for catalytic steam reforming of a steam/fuel mixture and/or for the partial oxidation of an oxygen/fuel mixture, thereby generating a product gas containing hydrogen-rich medium;
 a gas cleaning stage for removing carbon monoxide from the product gas by selective CO oxidation and having a principal flow path for the product gas,
 wherein the principal flow path is split at least over a certain length into first and second parallel flow paths which are then brought together again; and
 wherein a flow-diverting element is arranged at least in the first parallel flow path to open or block the first flow path in a temperature-dependent manner.

17. A method of operating a fuel cell system, comprising:
 during a cold start of the fuel cell system, generating a hydrogen-rich product gas by at least one of catalytic steam reforming of a steam/fuel mixture or partially oxidizing an oxygen/fuel mixture, wherein the hydrogen-rich product gas also comprises condensed water and carbon monoxide;
 below a predetermined temperature, causing the product gas to flow through a first parallel flow path containing an adsorber while blocking the product gas from flowing through a second parallel flow path, thereby adsorbing the condensed water and storing a portion of the carbon monoxide with an adsorber located in the first parallel flow path;
 above the predetermined temperature, causing a temperature-dependent flow-diverting element to open the second parallel flow path that is branched off from the first parallel flow path, thereby flowing a substantial portion of a warmer hydrogen-rich product gas through the second parallel flow path; and
 selectively oxidizing carbon monoxide from the warmer hydrogen-rich product gas downstream from a point where the first parallel flow path and the second parallel flow path join.

\* \* \* \* \*